United States Patent
Kanne et al.

(10) Patent No.: US 12,147,426 B2
(45) Date of Patent: Nov. 19, 2024

(54) COMPUTERIZED SYSTEMS AND METHODS FOR MATERIALIZED VIEW MATCHING

(71) Applicant: WORKDAY, INC., Pleasanton, CA (US)

(72) Inventors: Carl-Christian Kanne, Campbell, CA (US); Brian Guarraci, Highlands Ranch, CO (US); Chris Brand, Livermore, CA (US); Eric Ranstrom, Moraga, CA (US); Kevin Beyer, San Francisco, CA (US)

(73) Assignee: WORKDAY, INC., Pleasanton, CA (US)

( * ) Notice: Subject to any disclaimer, the term of this patent is extended or adjusted under 35 U.S.C. 154(b) by 33 days.

(21) Appl. No.: 17/693,917

(22) Filed: Mar. 14, 2022

(65) Prior Publication Data

US 2023/0289341 A1    Sep. 14, 2023

(51) Int. Cl.
| | | |
|---|---|---|
| G06F 16/00 | (2019.01) | |
| G06F 16/215 | (2019.01) | |
| G06F 16/2453 | (2019.01) | |
| G06F 16/2455 | (2019.01) | |

(52) U.S. Cl.
CPC ...... *G06F 16/24539* (2019.01); *G06F 16/215* (2019.01); *G06F 16/2456* (2019.01)

(58) Field of Classification Search
None
See application file for complete search history.

(56) References Cited

U.S. PATENT DOCUMENTS

| | | | |
|---|---|---|---|
| 6,850,933 B2 * | 2/2005 | Larson | G06F 16/24535 707/999.102 |
| 11,216,462 B1 * | 1/2022 | Jain | G06F 16/24542 |
| 11,550,787 B1 * | 1/2023 | Hernich | G06F 16/24539 |
| 2003/0088541 A1 * | 5/2003 | Zilio | G06F 16/22 |
| 2005/0097084 A1 * | 5/2005 | Balmin | G06F 16/8365 |
| 2009/0024571 A1 * | 1/2009 | Thiyagarajan | G06F 16/24539 |
| 2021/0165783 A1 * | 6/2021 | Deshpande | G06F 16/24568 |
| 2022/0067043 A1 * | 3/2022 | Levine | G06F 16/27 |
| 2022/0300491 A1 * | 9/2022 | Gruszecki | G06F 16/2393 |
| 2022/0300492 A1 * | 9/2022 | Papakonstantinou | G06F 16/2445 |
| 2023/0177049 A1 * | 6/2023 | Xu | G06F 16/24539 707/717 |

* cited by examiner

*Primary Examiner* — Bai D Vu
(74) *Attorney, Agent, or Firm* — James J. DeCarlo; Greenberg Traurig, LLP

(57) ABSTRACT

Disclosed are systems and methods for a materialized view matching framework that operates to improve the re-usability of materialized views within a database by, inter alia: i) enabling selection and aggregation of multiple materialized views; ii) generating and using validity filter predicates to exclude invalid data from materialized views; iii) generating and using change summaries to generate validity filter predicates; and iv) enabling on-demand transactional refresh operations. Such operations enable a more computational efficient and accurate usage of database data so as to provide more credible and desirable search results.

17 Claims, 7 Drawing Sheets

COMPUTERIZED SYSTEMS AND METHODS FOR MATERIALIZED VIEW MATCHING

BACKGROUND

Materialized view matching is a technique used in Database Management Systems (DMS) that re-uses previously computed and stored query responses (referred to as "materialized views") to execute new queries against a database.

SUMMARY

Materialized view matching reduces response time and improves efficiency in the use of database resources for housing data as well as accessing, retrieving and providing requested data. For example, when a new query is found as "matched" with regard to an available materialized view, the new query can be executed by reading the pertinent, previously computed materialized views, instead of performing additional computations and transactions against the database.

Current solutions for materialized view matching encounter many challenges. Among other deficiencies in their structure and execution, current systems cannot utilize more than one materialized view per base table in responding to a query, and in many cases, these views may be outdated. This, among other computational deficiencies, may lead to a waste of computational resources both on the network and at the device and/or server level. Also, inaccurate results may lead to user abandonment as well as redundant tasks, further draining system resources.

In existing systems, more than one materialized view may be used to answer a query. In such systems, a query processor needs to make sure that the data from each base table is available from some of the used views, but multiple base tables may already have been combined into a single materialized view. For example, if a query uses multiple base tables (e.g., U, V), then the processor may use two materialized views, one containing precomputed data from T and U, the other data from V. Each of the base tables needs to be "covered" by at most one view, but each view may cover more than one base table. For another example, the database may be subject to materialized views that are redundant, and/or inaccurate, which can lead to faulty responses, as well as duplicative yet counter results that may only lead to further queries to correct the initially incorrect or inaccurate results.

Moreover, existing materialized view mechanisms may also be precomputed via databases with operational states that are outdated (or have not yet been or need to be updated). To tolerate and/or rely on such outdated data is dangerous and can cause transactional guarantees to be ignored, or worse, for query results not to be trusted. Even asynchronous updates may not ensure the integrity of the data being accessed and/or retrieved.

Therefore, currently known systems fall short of establishing materialized view matching solutions that maximize the re-usability of previously computed query responses without sacrificing the transactional accuracy or transactional efficiency required for modern database processing.

The systems and methods disclosed herein address these shortcomings, among others, and provide an improved materialized view matching framework through the use of multiple views on the same base table. The disclosed materialized view matching framework, as discussed in more detail below, is configured to improve the re-use of materialized views in one or more ways: i) enable selection and merging of multiple materialized views for a single base table, ii) generate and use validity filter predicates to exclude invalid data from materialized views, iii) generate and use summaries to generate validity filter predicates; and iv) enable transactionally consistent query responses by utilizing outdated materialized views (e.g., materialized views containing invalid or outdated data) that are supplemented with selective use of valid data from a base table.

For purposes of this discussion, in some embodiments as discussed herein, a "base table" is a user defined physical table used in user queries. In some embodiments, as discussed herein, an "original query" is a query from the user defined on base tables.

In some embodiments, as discussed herein, a "materialized view" is an arbitrary query the output of which has been stored as a system-managed physical table. The materialized view can include, but is not limited to, a query definition, a result, and a point in transaction time when the view was last refreshed.

In some embodiments, as discussed herein, a "view definition" is a query definition used to create a materialized view. In some embodiments, as discussed herein, "base columns" are fields in the base tables. In some embodiments, as discussed herein, "view columns" are fields stored in the materialized views. In some embodiments, as discussed herein, "transaction time" is a time axis where all update transactions are sequentially ordered. In some embodiments, as discussed herein, "matched execution plan" is the original query's execution plan modified to read materialized views instead of base tables.

According to some embodiments, the improved materialized view matching framework can perform selection and aggregation of multiple materialized views to execute a new query. In some embodiments, as discussed in more detail below, this can involve identifying a set of coverage filters and identifying a set of applicable materialized views based on such coverage filters such that the identified set of materialized views are aggregated to execute the new query. In some embodiments, as discussed in more detail below, each coverage filter can be configured to correspond to at least one column field of a database, and each materialized view can be configured to be associated with at least a coverage filter.

According to some embodiments, the improved materialized view matching framework generates and uses filter predicates to exclude stale data from materialized views. In some embodiments, as discussed in more detail below, this can involve determining a validity filter predicate based on a transaction time of a new query and a transaction time associated with each materialized view, then identifying a set of materialized views based on the new query, the coverage filter and the validate filter predicate, such that the identified set of materialized views are applied with the exclusion of invalid data. In some embodiments, as discussed in more detail below, each new query can be configured to include or correspond to a transaction time, and each materialized view can be configured to be associated with at least a coverage filter as well as a transaction time indicating when each materialized view is executed.

According to some embodiments, the improved materialized view matching framework generates and relies upon summaries to generate validity filter predicates. In some embodiments, as discussed in more detail below, this can involve executing a plurality of queries against a database, identifying a plurality of materialized views for the plurality of queries, generating summaries in connection with the materialized views, updating the summaries upon each execution of a query of the plurality of queries, and then analyzing each generated summary to establish a watermark with regard to the validity such that a validity filter predicate is generated based on a new query and the watermark. In some embodiments, as discussed in more detail below, each summary can be configured to reflect at least a change(s) to the database.

According to some embodiments, the improved materialized view matching framework performs on-demand transactional refresh operations. In some embodiments, this can involve identifying a validity filter based on accessed materialized views, and applying the identified validity filter to the accessed materialized views, such that both a portion of the accessed materialized views applicable to executing a new query and a portion of the database to execute the new query against are utilized. In some embodiments, as discussed in more detail below, each materialized view can be configured to be associated with at least a coverage filter and at least a summary.

In accordance with one or more embodiments, the present disclosure provides a non-transitory computer-readable storage medium for carrying out the above mentioned technical steps of improved materialized view matching. The non-transitory computer-readable storage medium has tangibly stored thereon, or tangibly encoded thereon, computer readable instructions that when executed by a device cause at least one processor to perform a method for materialized view matching that dynamically maximizes the re-usability of previously computed query responses with the transactional accuracy and transactional efficiency.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF EXAMPLE EMBODIMENTS

Figure 1:
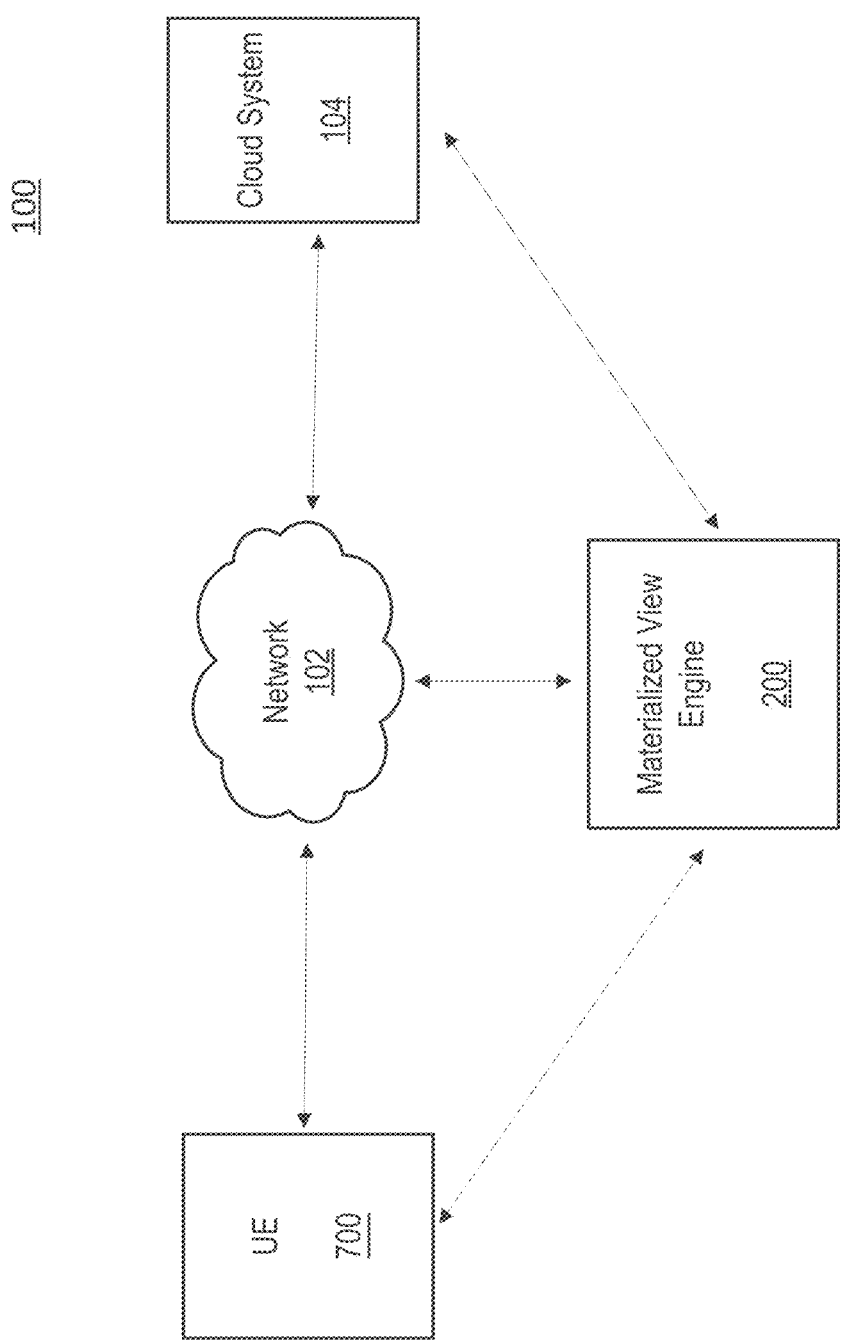
FIG. 1 is a block diagram of an example configuration within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/ acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a computing device, which may be a client (or consumer or user) device, referred to as user equipment (UE)), may include a computing device capable of sending or receiving signals, such as via a wired or a wireless network. A client device may, for example, include a desktop computer or a portable device, such as a cellular telephone, a smart phone, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

With reference to FIG. 1, system 100 is depicted which includes computing device (e.g. UE) 700, network 102, cloud system 104 and materialized view engine 200. UE 700 can be any type of device, such as, but not limited to, a mobile phone, tablet, laptop, personal computer, sensor, Internet of Things (IoT) device, autonomous machine, and any other device equipped with a cellular or wireless or wired transceiver. Further discussion is provided below in reference to FIG. 7.

Network 102 can be any type of network, such as, but not limited to, a wireless network, cellular network, the Internet, and the like (as discussed above). Network 102 facilitates connectivity of the components of system 100, as illustrated in FIG. 1.

Cloud system 104 can be any type of cloud operating platform and/or network based system upon which applications, operations, and/or other forms of network resources can be located. For example, system 104 can be a service provider and/or network provider from where services and/or applications can be accessed, sourced or executed from. In some embodiments, cloud system 104 can include a server(s) and/or a database of information which is accessible over network 102. In some embodiments, a database (not shown) of cloud system 104 can store a dataset of data and metadata associated with local and/or network information related to a user(s) of UE 700 and the UE 700, and the services and applications provided by cloud system 104 and/or materialized view engine 200.

Materialized view engine 200, as discussed above and below in more detail, includes components for optimizing how materialized views are matched with new queries to maximize the re-usability of previously computed query responses with improved transactional accuracy or transactional efficiency. According to some embodiments, materialized view engine 200 can be a special purpose machine or processor and could be hosted by a device on network 102, within cloud system 104 and/or on UE 700. In some embodiments, engine 200 can be hosted by a peripheral device connected to UE 700.

According to some embodiments, as discussed above, materialized view engine 200 can function as an application provided by cloud system 104. In some embodiments, engine 200 can function as an application installed on UE 700. In some embodiments, such application can be a web-based application accessed by UE 700 over network 102 from cloud system 104 (e.g., as indicated by the connection between network 102 and engine 200, and/or the dashed line between UE 700 and engine 200 in FIG. 1). In some embodiments, engine 200 can be configured and/or installed as an augmenting script, program or application (e.g., a plug-in or extension) to another application or program provided by cloud system 104 and/or executing on UE 700. According to some embodiments, as discussed below, base tables can be housed at a shared service cluster of data and or logic hosting, while the materialized view engine 200 may be housed at an abstraction layer separate from the service (e.g., over a data API and data analytic applications, such as, for example, Workday Prism Analytics™).

By way of a non-limiting example, a data analytic application, such as Workday Prism Analytics, can facilitate integrating and managing data from various sources internal and external to a customer's organization. In some implementations, such a data analytic application can furnish an abstract layer that facilitates providing interactive data preparation that can involve, for example, importing, cleaning and transforming data, in addition to aggregating data for executing queries with heightened efficiency and accuracy. In one example, after receiving data from the data API, a data analytic application can be configured to partition the data, generate materialized views (e.g., telescopic materialized views), and aggregate the data by various criteria (e.g., date, month, year, ledger account, ledger hierarchy and the like). As such, a data analytic application can be configured 'to determine which portions of a request it receives can be served from stored materialized views, and which portions of the data required to serve the request might be stale (e.g., at an aggregation level and/or instance level).

Figure 2:
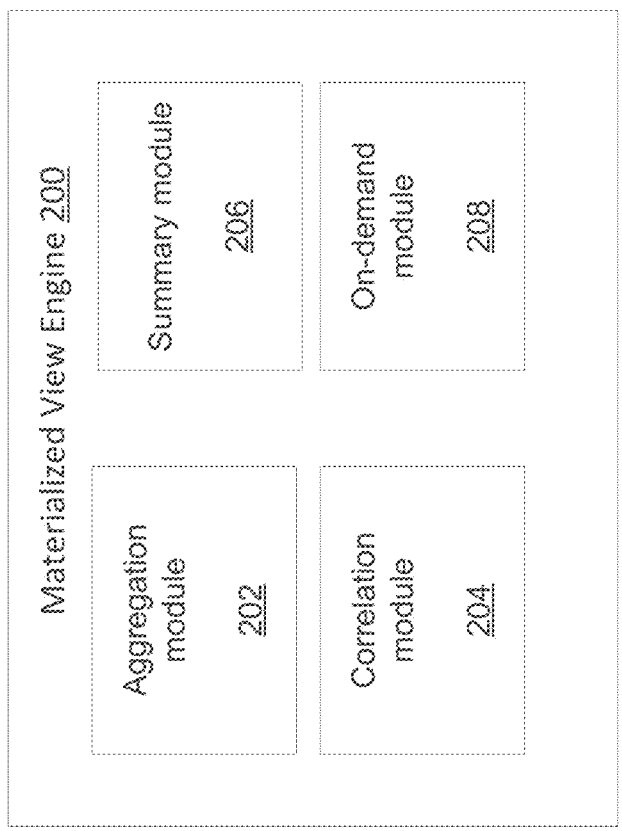
FIG. 2 is a block diagram illustrating components of an exemplary system according to some embodiments of the present disclosure.

As illustrated in FIG. 2, according to some embodiments, materialized view engine 200 includes aggregation module 202, correlation module 204, summary module 206 and on-demand module 208. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below in relation to FIGS. 3-6.

Figure 3:
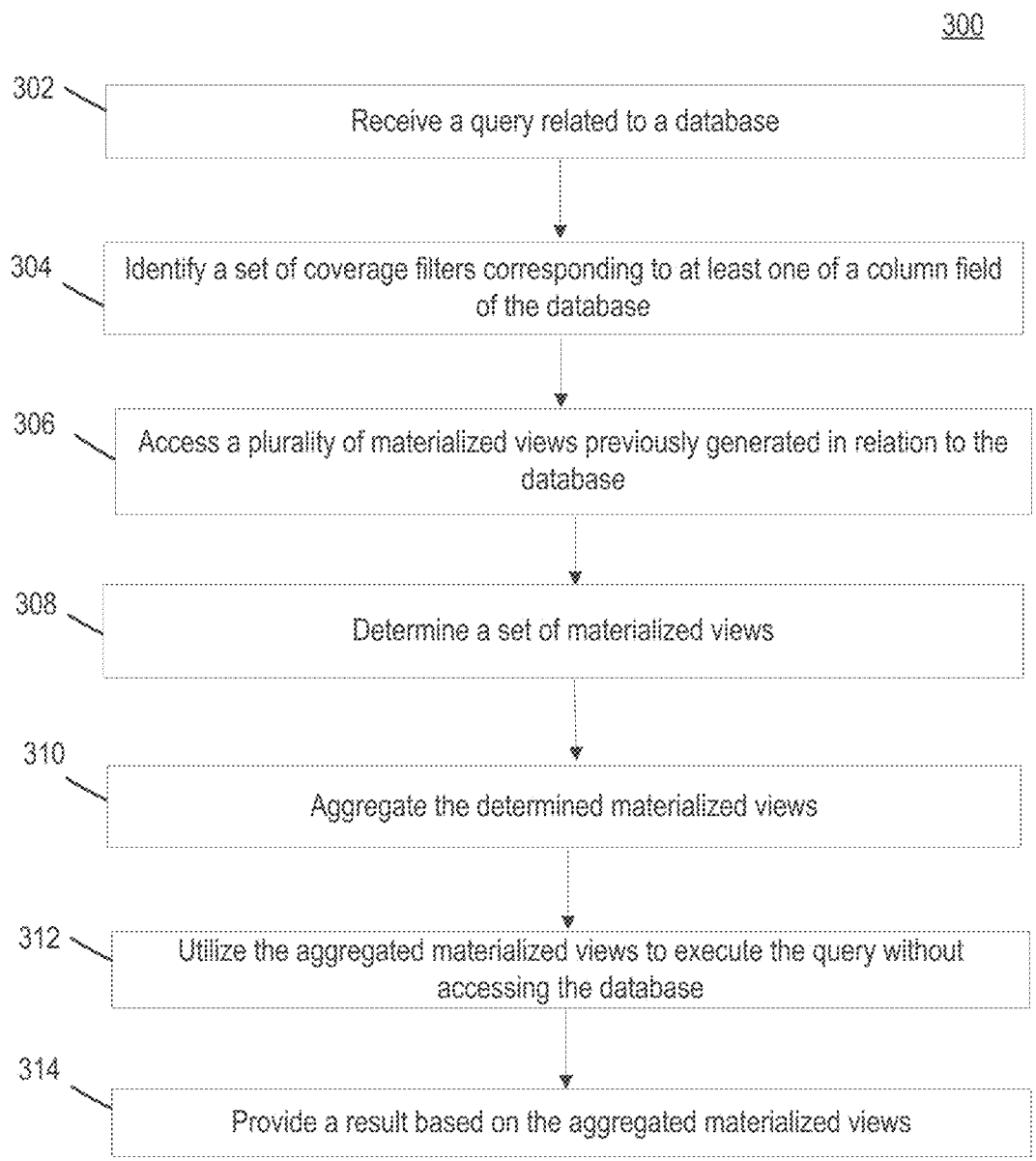
FIG. 3 illustrates an exemplary data flow according to some embodiments of the present disclosure.

FIG. 3 provides Process 300 which details non-limiting example embodiments of the disclosed materialized view matching framework's operations of selection and aggregation of multiple materialized views. According to some embodiments, Steps 302-314 of Process 300 can be performed by aggregation module 202 of materialized view engine 200.

Process 300 begins with Step 302 where a query against a database is received. According to some embodiments, a query can include one or more commands to access, retrieve, insert, delete, or update data housed in a database. For example, for a relational database, a query can be structured as a structured query language (SQL) statement. A query can be generated by a user manually or an application automatically. A database can be implemented in any form or format. In one example, the database can be implemented as a database system and managed by a DMS. In another example, the database can be shared by multiple customers as a multi-tenant database system.

According to some embodiments, prior to reaching a database management system associated with the underlying database, a query can be intercepted by aggregation module 202 of materialized view engine 200. For example, a query may inquire about quarterly data in the past three years against the database.

In Step 304, a set of coverage filters are identified, where each coverage filter corresponds to at least one of a column field of the database. According to some embodiments, the set of coverage filters can be identified based on the original queries utilized to compute the materialized views against one or more base tables. In some embodiments, the set of coverage filters can collectively correspond to a column field referenced in the query, fully or partially. For example, amongst other materialized views available, a materialized view M1 may store the results of a previously executed query about quarterly data up to the last year, a materialized view M2 may store the results of a previously executed query about monthly data in the first half of the current year, and a materialized view M3 may store the results of a previously executed query about daily data for the current year. In this example, the set of coverage filters can be identified as more than one year old, current as of the first half of the current year, and current as of the current year for the respective materialized views.

In Step 306, a plurality of materialized views previously generated against the database are accessed. In some embodiments, each of the plurality of materialized views can be associated with an identified coverage filter. According to some embodiments, the database can store and maintain part or all of the previously computed queries in order to save time and computational resources by avoiding repeated query executions. In some embodiments, these pre-executed, cached query results can be stored as a plurality of materialized views in connection with the underlying database. In some embodiments, each previously generated materialized view can be associated with a coverage filter identified in Step 304.

In Step 308, a set of materialized views from the plurality of views are determined based on the query and respective coverage filters. According to some embodiments, instead of being limited to a single materialized view to compute part or all of the query, for example, from a same base table(s), multiple materialized views can be analyzed, applied, and combined to provide the necessary data required to execute the query.

Continuing from the example above, the materialized views M1, M2, and M3 can be determined as the set of materialized views to compute the query, according to their respective coverage filters defined in their view definitions as well as the query. The materialized views applicable to the execution of the query may have different degrees of summarization applied, and/or different coverage filters, as long as these views can collectively provide the data coverage from the base table(s) required to compute the query.

In some embodiments, the materialized views M1, M2, and M3 can contain overlapping data. For example, as materialized view M2 stores the monthly data in the first half of the current year, and materialized view M3 stores the daily data for the current year, there then can be data for the current year that is available in both materialized view M2 and materialized view M3.

According to some embodiments, the disclosed framework can be configured to automatically filter the overlapping data to reduce the overall amount of data for subsequent processing to execute the query. In a non-limiting example, multiple materialized views determined as part of the set of materialized views (matches) can be combined into a single materialized view as a matched view (match M) for executing the query or part of the query (E) with a filter on some of the materialized views to exclude duplicate contributions, as explained further below.

For purposes of this discussion, in some embodiments as discussed herein, an engine 200 can execute an alternative (materialized view based) execution plan A(M) to obtain result rows of E. In some embodiments, A(M) may return only a subset of the rows in the results of executing E (e.g., see P(M) below). In some embodiments, A(M) may return more fields than the results of executing E.

According to some embodiments, by way of non-limiting example, it is assumed that equivalent fields in E and all matches of E are identical, and the same operations can be applied to obtain the field value. For example, this can be ensured by the view matching process, such that all fields that are equivalent (e.g., have the same operations applied to obtain their value) fields in E and all matches of E have the same name or ID.

According to some embodiments, S(M) may include the fields returned by A(M). In some embodiments, for example, S(M) can include a superset of the fields of E. P(M) may include the coverage predicate describing which rows are returned from A(M). In some embodiments, for example, the output of E filtered by P(M) is the output of A(M). In some embodiments, for example, P(M) may contain fields that are not in the output of A(M) or E, but instead is defined inside of E or A(M) and then projected out. C(M) may include the cost of evaluating A(M).

According to some embodiments, when there is no match identified, for example, an empty match may be defined as: A(Ø)=no rows, S(Ø):=S(E), P(Ø):=FALSE, C(Ø):=0.

According to some embodiments, when there is a match identified, for example, match M may subsume another match N (e.g., written or defined as M>>N, if S(N)⊆S(M) and P(N)⇒P(M)). Here, ⇒ is an implication relationship so that if P(N) is true, then P(M) must also be true (e.g., for example, all rows of N may be contained in M).

According to some embodiments, engine 200 can be configured to determine such implication relationship(s). According to some embodiments, to improve performance, the implication relationship may need not be complete, which may incur the risk of missing some correct combinations of matches. In some embodiments, an exemplary implication relationship may be based on, for example, disjunctions of intervals on a single time field, and (in) equality on some categorical fields, a limited depth of the Boolean expression tree in P, and the like. In some embodiments, additional or more knowledge about other relations can be used in predicates. For example, hierarchies such that X is in sub-organization of "US Sales'"=>X is in sub-organization of "Sales'".

According to some embodiments, when there is a match identified, for example, match M may dominate another match N (e.g., defined as M>>N and C(M)<C(N)). For example, a combination M ∪ N of two matches M and N may generate another match, which has the most coverage that can be obtained by combining if possible. In another non-limiting example, combination may not be possible if the overlap between the match coverages of M and N cannot be filtered because, for example, the necessary fields may not be exposed in S(M) or S(N). According to some embodiments, the combination can be defined in the following:

FN:=TRUE if C(N)<=C(M) and the fields of P(N) are in S(M)
NOT (P(M)) if the fields of P(M) are in S(N)
FALSE otherwise
FM:=TRUE if C(M)<=C(N) and the fields of P(M) are in S(N)
NOT (P(N)) if the fields of P(N) are in S(M)
FALSE otherwise
If FM ⇒FALSE and FN FALSE then M∪N=Ø
If FM ⇒FALSE then M∪N=N
If FN ⇒FALSE then M∪N=M
Otherwise
A(M∪N):=Union(Project(S(M), Filter(FN, A(N)), Project(S(N), Filter(FM, A(M)))))
S(M∪N):=S(N)∩S(M)
P(M∪N):=P(M) OR P(N)
C(M∪N):=C(M)+C(N)+Union/Filter/Projection Cost, wherein operations of Union, Project and Filter may be defined as the usual bulk operations in query runtimes provided by the underlying system.

In one non-limiting example, the following pseudo-code illustrates a process executed by engine 200 to implement the computerized techniques described above. Here, the input may include a set of matches I for E (e.g., views generated by the view matching algorithm). The output may include the lowest cost combination of matches for E that covers all rows returned from E, each exactly once, or Ø if no such match exists.

```
dominant := { Ø }
    for each M ∈ I in ascending C(M) order
        for each match D ∈ dominant in ascending C(D) order
            N := M ∪ D
            If P(N) ⇒ TRUE: return N
            if ∀e ∈ dominant: NOT(e >> N) OR C(e) > C(N)
            dominant := { N } ∪ { e ∈ dominant | NOT(N >> e) OR C(N) >= C(e) }
        }
return Ø
```

According to some embodiments, the above-illustrated exemplary algorithm may maintain a dominant set of matches that either cover more rows, return more fields, or are cheaper in cost than other combinations of matches that may be considered. In each outer iteration, engine 200, via execution of the above discussed algorithm, may try to extend all current dominant matches by combining them with another input match. If the new match is not dominated by any existing dominant matches, it is added to the dominant set, and all matches dominated by it are removed. In this example, since both loops operate in ascending cost order, the first match found that covers all rows (e.g., its predicate is equivalent to true) is the desired result. This exemplary algorithm can have exponential complexity in the number of input matches in general, as each added match in the outer loop may double the size of the dominant set.

According to some embodiments, the exemplary algorithm may be configured to run faster under certain assumptions, or be configured as specialized. In some implementations, the considered input matches may have the same set of fields S(M) and the coverage predicates of the views are not overlapping, or only referring to fields in S(M). In this case, the dominant set may always have only one element, and the exemplary algorithm may be linear in the number of input matches.

According to some embodiments, there are the options to precompute the dominant complete match for a given catalog of materialized views before the queries are known. In one example, this is only possible by making assumptions about the queries that will be encountered, as the inputs to the algorithm are matches to some fixed E. For example, select view definitions may be used as E to match, and the algorithm may be used on all views which return a superset of the view's fields. In another example, select arbitrary projections of the view may be used to select fewer fields as E, and precompute the result. If some set of fields needed by a query has been precomputed like this, the corresponding view combination can be located in constant time.

According to some embodiments, the exemplary algorithm above can function as a sub-part of the execution plan E, and assumes the work of matching views to E is finished. That is, only views matching with E can be combined. If matches for different parts of the original execution plan need to be combined, it may be required to interweave view matching and view combination into a single algorithm.

In one example, a view identified may extract the quarter data from a row's date and then aggregate (e.g., details of aggregation is described with reference to step 310, below) to the quarter, thus having coverage up until Q4 2020. Another view identified may aggregate to the day and thus have coverage starting from 2021. As such, a query that aggregates to the quarter and requires data for all time can use both views, with each view matching to a different part of the execution plan.

According to some embodiments, view matching works by extending matches of subplans to matches of larger parts of the execution plan of a query. It may already consider multiple candidate views at each subplan matching step. In one example, heterogeneous cases like the example above may be covered by running a combination algorithm at each subplan to combine the candidate matches into a set of dominant matches with limited coverage, which are then propagated to the next level of the matching algorithm.

Continuing with Process 300, in Step 310, the determined materialized views are aggregated. According to some embodiments, as the determined materialized views may be computed based on coverage filters different from but related to the query at hand, the aggregation module 202 can aggregate data housed in the materialized view according to the query, if needed.

By way of a non-limiting example, continuing from the example above, since the materialized view M1 is computed to provide quarterly data already, there is no need to further aggregate the data therefrom. However, for the monthly data provided by the materialized view M2 and the daily data provided by the materialized view M3, the aggregation module 202 can further aggregate the monthly data into quarterly data; as well as aggregate the daily data into quarterly data (that is not already covered by aggregating the monthly data from the materialized view M2), respectively.

In Step 312, the determined one or more aggregated materialized views are utilized to execute the query without accessing the database. According to some embodiments, the aggregation module 202 can determine how and whether the coverage filters associated with the determined materialized views overlap (e.g., portions of the data of the current year is available as both the monthly data of the materialized view M2 and the daily data of the materialized view M3) based on which suitable operations (e.g., unions) of materialized views can be performed in order to compute the query.

By way of a non-limiting example, continuing from the example above, the quarterly data provided by the materialized view M1 can be joined with the quarterly data aggregated from the monthly data provided by the materialized view M2, the result of which can be further joined with the quarterly data aggregated from the daily data provided by the materialized view M3. As a result, since the full data coverage is disbursed across three different materialized views, the aggregation module 202 can process the query based on these three cached query results without accessing the underlying database.

In Step 314, the result of query execution is provided based on the aggregated materialized views. According to some embodiments, the result of the query as computed via the aggregated materialized views can constitute the full execution of the query. In other embodiments, and as described in detail below with reference to FIG. 6, the query results computed via the aggregated materialized views can constitute partial execution of the query, which can be supplemented with further processing provided by, for example, the on-demand module 208 (as discussed below in relation to FIG. 6).

According to some embodiments, the aggregation module 202 can select and aggregate applicable materialized views to execute part of the query. In some embodiments, the materialized views available for selection may not cover all rows of the base table(s). As such, the aggregation module 202 can re-use the materialized views to partially compute the query to reduce, if not eliminate, the amount of data being accessed from the database.

Expanding on the example above, for a different query that requests annual data from the last year, the quarterly data provided by the materialized view M1 can still be used to execute the query. In these scenarios, the aggregation module 202 can invoke the on-demand module 208 to trigger the required data access to the database for executing the portions of the query that cannot be computed based on the materialized views. More detail of the on-demand module 208 and this and similar types of functionality are described below with reference to FIG. 6.

Figure 4:
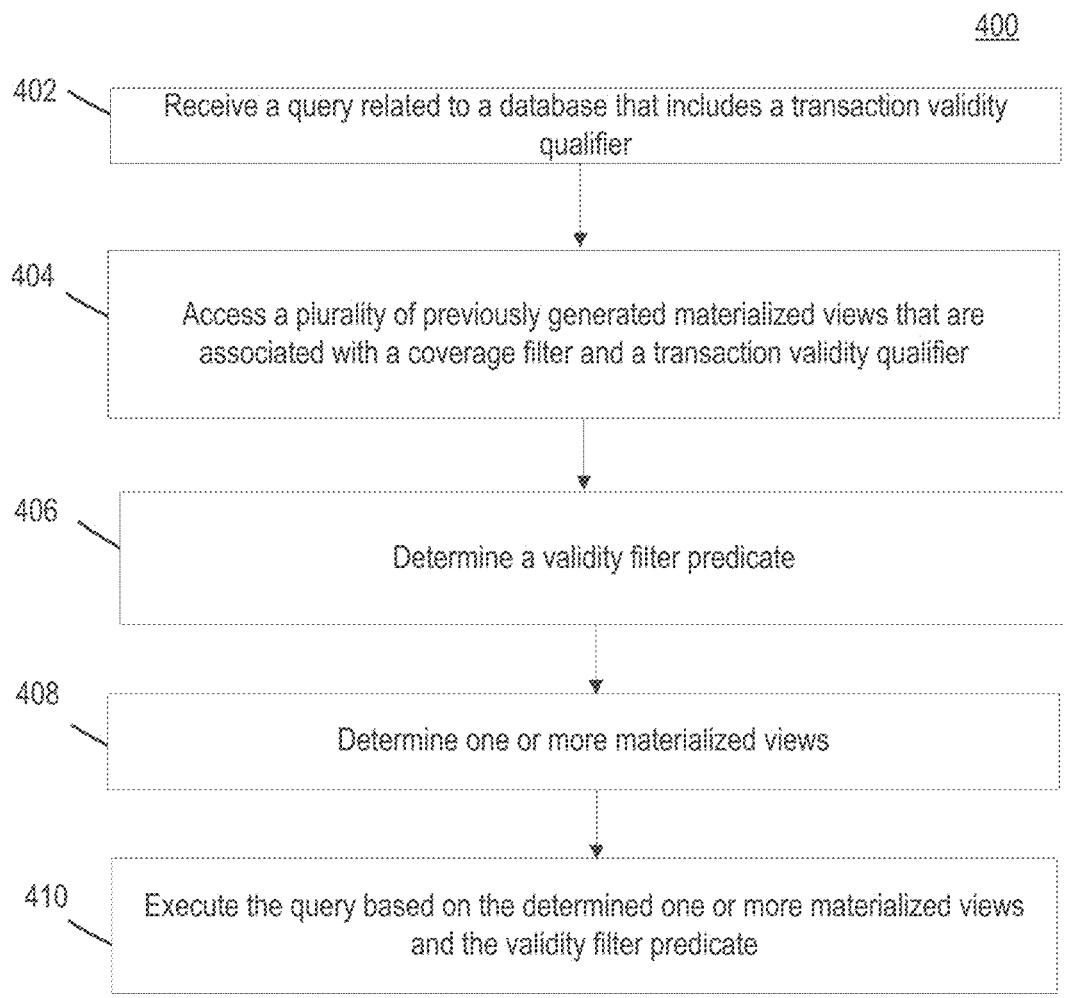
FIG. 4 illustrates an exemplary data flow according to some embodiments of the present disclosure.

FIG. 4 provides Process 400 which details non-limiting example embodiments of the disclosed materialized view matching framework's operations for generating and utilizing filter predicates to exclude invalid data from materialized views. According to some embodiments, Steps 402-410 of Process 400 can be performed by correlation module 204 of materialized view engine 200.

Process 400 begins with Step 402 where a query against a database is received, where the query includes a transaction validity qualifier. According to some embodiments, the transaction validity qualifier may include a transaction time. In this scenario, Process 400 can be utilized to exclude stale data (e.g., rows associated with stale dates) from the pertinent materialized views to compute the query. In some embodiments, the transaction validity qualifier can include any type and/or any number of criteria that may correlate to the attributes of the data stored in the materialized views. In one embodiment, the transaction validity qualifier may include a geographical location, a department related criterion, a categorical criterion, and the like, or some combination thereof.

According to some embodiments, prior to reaching a database management system associated with the underlying database, a query can be intercepted by correlation module 204 of materialized view engine 200. The query can be processed to extract or otherwise obtain the transaction validity qualifier (e.g., the transaction time). For example, a query may inquire about data at a transaction time t when applicable materialized views are known to be refreshed or executed at a transaction time s.

In Step 404, a plurality of materialized views previously generated against the database are accessed. In some embodiments, each of the plurality of materialized views can be associated with a coverage filter and a transaction validity qualifier that corresponds to when each materialized view was executed.

Similar to functionality discussed above in relation to FIG. 3, according to some embodiments, the database can store and maintain pre-executed, cached query results as a plurality of materialized views. In some embodiments, in addition to being precomputed corresponding to at least one prior query and associated with a coverage filter, each materialized view can be further associated with a transaction validity qualifier. Taking the transaction time as a non-limiting example for the transaction validity qualifier, each materialized view can be associated with a transaction time, e.g., the latest time when the materialized view was computed or refreshed, and the like.

In Step 406, a validity filter predicate is determined based on the transaction validity qualifier of the query and the transaction validity qualifier associated with each materialized view.

Continuing from the example above where an applicable materialized view is associated with a transaction time s, and the query is associated with a transaction time t, one exemplary solution to address stale data can involve determining a watermark that indicates "which is the oldest value of the accounting date column that has been modified between t and s." As an illustrative example, the watermark can be determined as a date of "Apr. 15, 2021," which can be used as the validity filter predicate. According to some embodiments herein, with the validity filter predicate, materialized views that are known to include invalid data (e.g., stale views having stale data) but nevertheless applicable to compute the query can be re-used despite the partial invalidity of its data. By the use of the validity filter predicate, such partial re-usability can replace the present binary approach where a materialized view is either applicable by virtue of all of its data being current, or not applicable at all by virtue of the opposite. This way, embodiments of the present disclosure further enhance transaction efficiency by enabling filtered/qualified re-usability of materialized views, without sacrificing transactional accuracy. More detail of the validity filter predicate is described with reference to FIG. 5, below.

In Step 408, one or more materialized views from the plurality of views are determined. In some embodiments, such determination can be based on the query, and coverage filters and validity filter predicate. According to some embodiments, instead of accessing the database or being limited to a single materialized view to compute part or all of the query, multiple materialized views can be analyzed, applied, and combined to provide the necessary data required to execute the query. Here, the difference can be that the materialized views applicable or re-usable are further qualified or scrutinized to ensure that no invalid data included therein is re-used to compute the query.

Continuing from the example above, with the validity filter predicate determined as "smaller (e.g., older or earlier) than Apr. 15, 2021," a respective filter can be applied to the available materialized views such that, only those rows in the materialized views associated with a transaction date earlier than the filtering date are re-used to compute the query. That is, the rows in the materialized views associated with a transaction date later than the filtering date are susceptible of being stale and thus excluded from being re-used to compute the query, given the known updates during that time range.

In Step 410, the query can be executed based on the determined one or more materialized views and the validity filter predicate. This enables accessing only data that was excluded via the validity filter, as discussed above.

According to some embodiments, the view columns may differ from the columns in the respective base table(s). For example, the above described materialized view M1 may not have an "Accounting Date" column but instead a "Quarter" column. In some embodiments, a filter can be determined based on the determined validity filter predicate. For example, the filter can be determined as "2021 Q2" such that rows associated with a transaction date later than "2021 Q2" can be excluded, despite that the excluded portion has valid data. In this sense, the validity filter predicate is determined with a high watermark with regard to an error in the direction of excluding more valid data from materialized views instead of including invalid data from materialized views. According to some embodiments, the tolerance to some inaccuracy allows for trade-offs in the methods illustrated here. For example, more frequent storage may be more accurate but also more resource intensive.

According to some embodiments, to determine a filter predicate, old minimum information may be compacted by coarsening the persistent time ranges. In one example, this can be done in the background, combining multiple time range minimum records into a single minimum covering the entire range, freeing storage space for less frequently used, older time ranges.

According to some embodiments, to determine a filter predicate, uncommitted changes may be included when storing the summarized minima. Instead of making queries wait minima to be committed, or requiring write transactions to serialize access to the persistent minima, the minima can be updated before the corresponding transaction commits.

According to some embodiments, the above methods can be used with unordered fields. For categorical fields, instead of recording minimal values, a set of all changed values may be recorded in a time interval instead.

According to some embodiments, to save space, it is possible to exploit partial orders, e.g., by way of hierarchies. In one example, if allowing validity predicates to contain hierarchy tests (e.g., data valid if 'X is within "Sales"'), instead of recording all the individual department values that have changed, they can be combined using a hierarchy-based aggregate such as, for example, "least common ancestor". In one example, instead of recording that data changed for "US Sales" and "EU Sales", they can be combined into a single value capturing data changed for "Sales". This may represent another space-computing tradeoff (e.g., as now data for "Asia Sales" is considered changed even if it hasn't).

In one example, for a department field, all department values can be recorded for rows that have changed. If a department field itself changes value for a row, both before and after values can be recorded as values that may be invalid now. In one example, this method is feasible for low cardinality fields, as the storage space for recording all changed values of high cardinality fields (such as row IDs) for all time intervals might be prohibitive.

According to some embodiments, the correlation module 204 can generate and use filter predicates to exclude invalid data from materialized views to execute part of the query. In some embodiments, the correlation module 204 can invoke the on-demand module 208 to trigger the required data access to the database for executing the portions of the query that cannot be computed by the materialized views qualified with the validity filter. More detail of the on-demand module 208 is described below with reference to FIG. 6.

Figure 5:
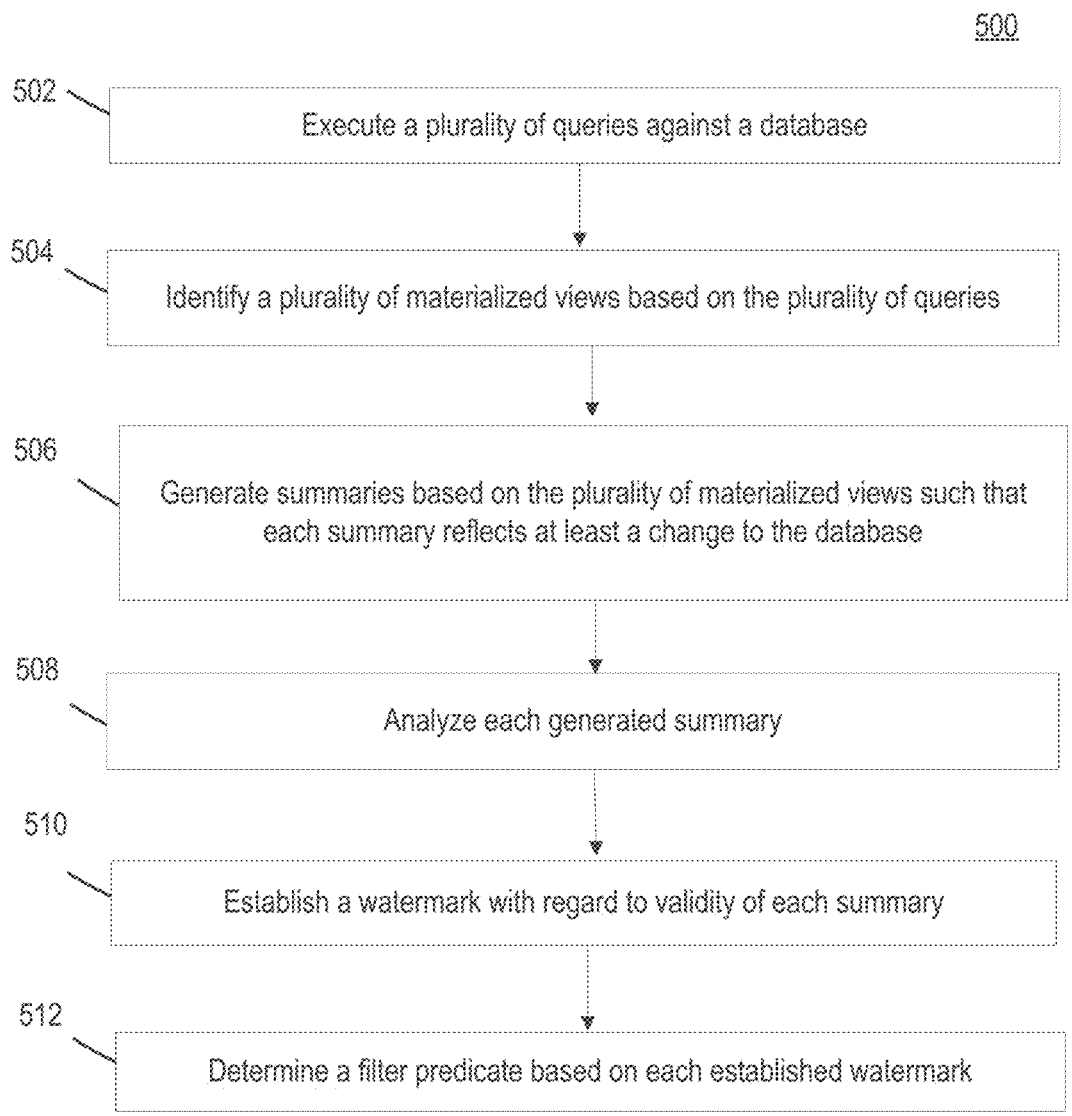
FIG. 5 illustrates an exemplary data flow according to some embodiments of the present disclosure.

FIG. 5 provides Process 500 which details non-limiting example embodiments of the disclosed materialized view matching framework's operations of generating and utilizing summaries to generate the above-described validity filter predicates. According to some embodiments, Steps 502-512 of Process 500 can be performed by summary module 206 of materialized view engine 200.

Process 500 begins with Step 502 where a plurality of queries are executed against a database. According to some embodiments, prior to reaching a database management system associated with the underlying database, a query can be intercepted by summary module 206 of materialized view engine 200. The query can be processed to extract or otherwise obtain the transaction validity qualifier (e.g., the transaction time).

In Step 504, a plurality of materialized views are identified for at least one of the plurality of queries. In a similar manner as discussed above, according to some embodiments, the database can store and maintain pre-executed, cached query results as a plurality of materialized views.

In Step 506, summaries are generated based on the identified materialized views. In some embodiments, summaries correspond to changes to the database, as discussed herein. In some embodiments, the generation of summaries can be based on each execution of a query of the plurality of queries, whereby the differences between each iterative execution evidences a change to the database that is included in a generated summary (e.g., change summary).

In some embodiments, the change(s) can be summarized for attributes of interest during the updating process. In one example, the attribute of interest can include a temporal attribute such as an accounting date (used in the examples illustrated above). By way of a non-limiting example, a change summary can be generated to indicate various change types such as, but not limited to, a journal line added, journal line deleted, journal line edited with fields other than the accounting date, and journal line edited for the accounting date, and the like.

In Step 508, each generated summary is analyzed; and in Step 510, a watermark is established with regard to validity.

By way of a non-limiting example, where the accounting date is determined as the attribute for which a change summary is generated, a current minimal (e.g., oldest) accounting date can be stored such that it can be updated upon each transaction that updates—for example, a journal line with either an accounting date smaller than the current one stored (e.g., the current minimal), or changing the accounting date on a journal line to a value smaller than the current one stored (e.g., the current minimal). In some embodiments, a number of transactions, an interval of time, and/or the current minimal can be upheld as a persistent value. In some embodiments, a high watermark value request for a time range can be serviced by combining all the persisted minimums for overlapping time ranges to determine a total minimum.

In some embodiments, the watermark does not need to be an accurate value, in that it can be a range, a threshold, or a set of values. For example, the watermark can be computed with a relaxed precision (e.g., with more fuzziness), e.g., the watermark can be implemented as a value smaller than the accurate value.

In Step 512, a filter predicate is determined based on the established watermark(s). According to some embodiments, using the above-illustrated temporal attribute as an illustrate non-limiting example, the materialized views can be filtered with the transaction time associated with the watermark to exclude data associated with a transaction time later than the watermark, which may have been updated since the materialized views were last refreshed.

Thus, according to some embodiments, the filter predicate can be applied to a set or plurality of materialized views so as to ensure that valid or up-to-date (e.g., non-stale) data (e.g., current materialized views) is being relied upon to execute a search. For example, Step 512 can be performed as a sub-step of Step 408, as discussed above.

Figure 6:
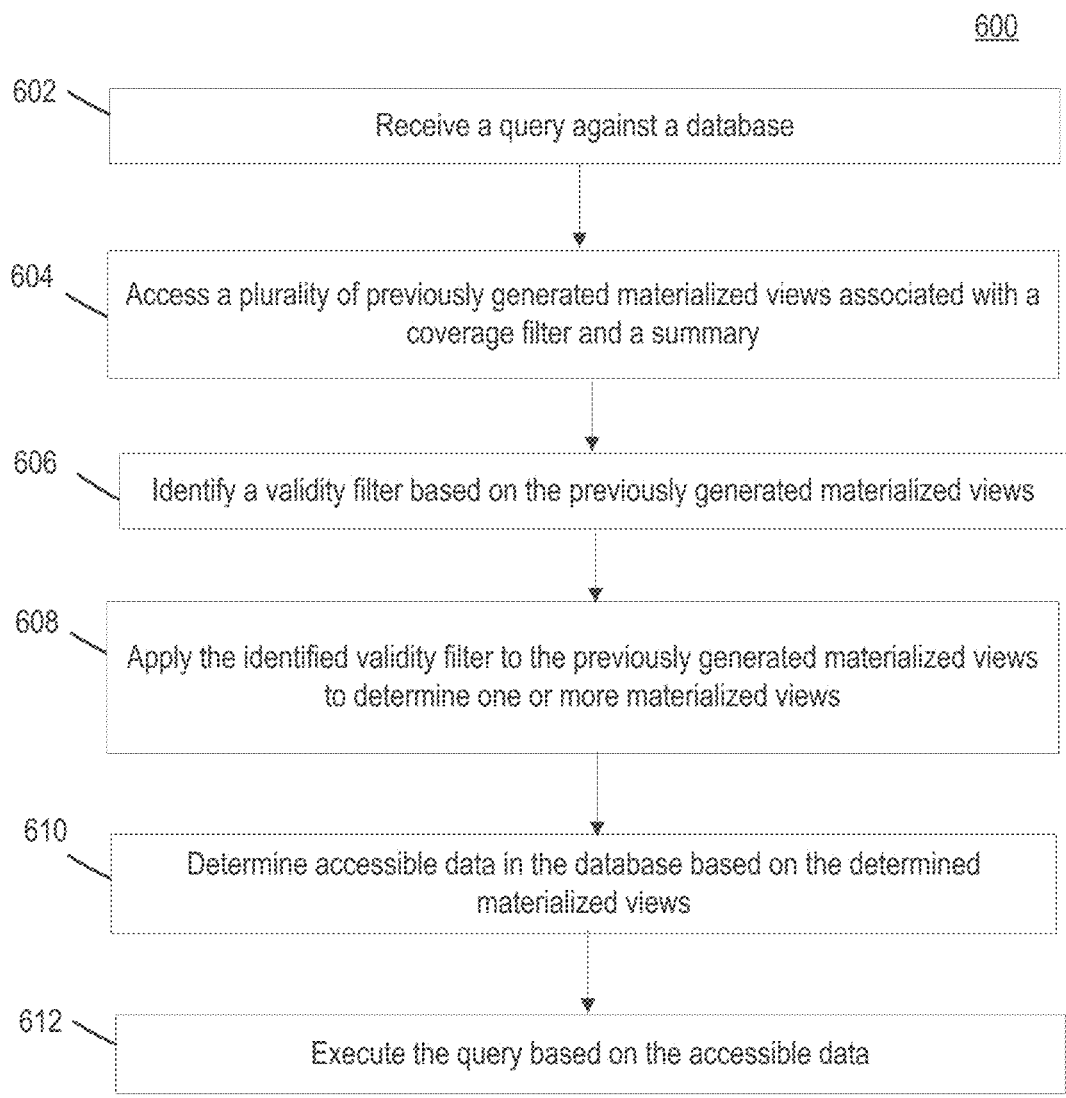
FIG. 6 illustrates an exemplary data flow according to some embodiments of the present disclosure.

FIG. 6 provides Process 600 which details non-limiting example embodiments of the disclosed materialized view matching framework's operations for performing an on-demand transactional refresh. According to some embodiments, Steps 602-612 of Process 600 can be performed by on-demand module 208 of materialized view engine 200.

Process 600 begins with Step 602 where a query against a database is received. According to some embodiments, prior to reaching a database management system associated with the underlying database, a query can be intercepted by on-demand module 208 of materialized view engine 200. In some embodiments, the query can be intercepted by the other modules of the materialized view engine 200 as described above, which in turn can trigger the operations of the on-demand module 208. In some embodiments, the converse can be configured such that the on-demand module 208 can intercept the query first and then trigger the respective other modules of the materialized view engine 200 to perform the respective functions in connection with executing the query received. In some embodiments, the query can be processed to extract or otherwise obtain the coverage filter, and the transaction validity qualifier (e.g., the transaction time).

In Step 604, a plurality of materialized views previously generated against the database are accessed, where each of the plurality of materialized views are associated with a coverage filter and a summary. According to some embodiments, as discussed above, the database can store and maintain pre-executed, cached query results stored as a plurality of materialized views. In some embodiments, in addition to being based on at least one prior query and associated with a coverage filter, each materialized view can be further associated with a summary (e.g., change summary).

In Step 606, a validity filter is identified based on the previously generated materialized views accessed in Step 604. According to some embodiments, Process 400 and 500 can be applied to perform the identification of the validity filter, as discussed above.

In Step 608, the identified validity filter is applied to the materialized views to determine one or more materialized views from the plurality of views based on the summary and the query. According to some embodiments, the steps of Process 300, 400 and/or 500 can be executed to perform the application of the identified validity filter to the materialized views based on the summary and the query, as discussed above.

In Step 610, based on the determination of the one or more materialized views, a determination is then made as to which data is accessible in the database (e.g., which materialized views correspond to accessible and valid data). According to some embodiments, the determination of the accessible data can be further based on an application of a validity filter associated with a materialized view and/or data identified as invalid data, as discussed above at least in Processes 300-500.

By way of a non-limiting example, after a filter determined as "2021 Q2" was applied such that rows associated with a transaction date later than "2021 Q2" are excluded for the available materialized views, rows in the respective base table(s) corresponding to a transaction date since "2021 Q2" can be determined as the fresh data for access in the underlying database for computing the query.

In Step 612, the determined one or more materialized views and the determined accessible data in the database are utilized to execute the query. According to some embodiments, one or more base tables required for executing the query (in addition to utilizing the materialized views exclusive of invalid data) can be treated as a materialized view(s). In some embodiments, for example, a base table can be treated as a materialized view having a view definition as the entire table without any operations/transactions/queries attached thereto.

In some embodiments, Process 500 and/or Process 600 can be implemented as a sub-step(s) of Step 612 to "prune" the views in order to preserve and therefore access only the valid parts. As to the base table treated as a view, such a view can overlap with all of the materialized views because the base table (view) may not be a snapshot of the database at a particular transaction time and therefore may not have invalid data.

According to some embodiments, various embodiments may be configured so that view matching algorithms can utilize the views exclusive of invalid data, and access the base tables for those rows included therein that have no corresponding valid data in the views. In this sense, relatively more resource expensive access to the database can be triggered on-demand despite the detected existence of invalid data.

Figure 7:
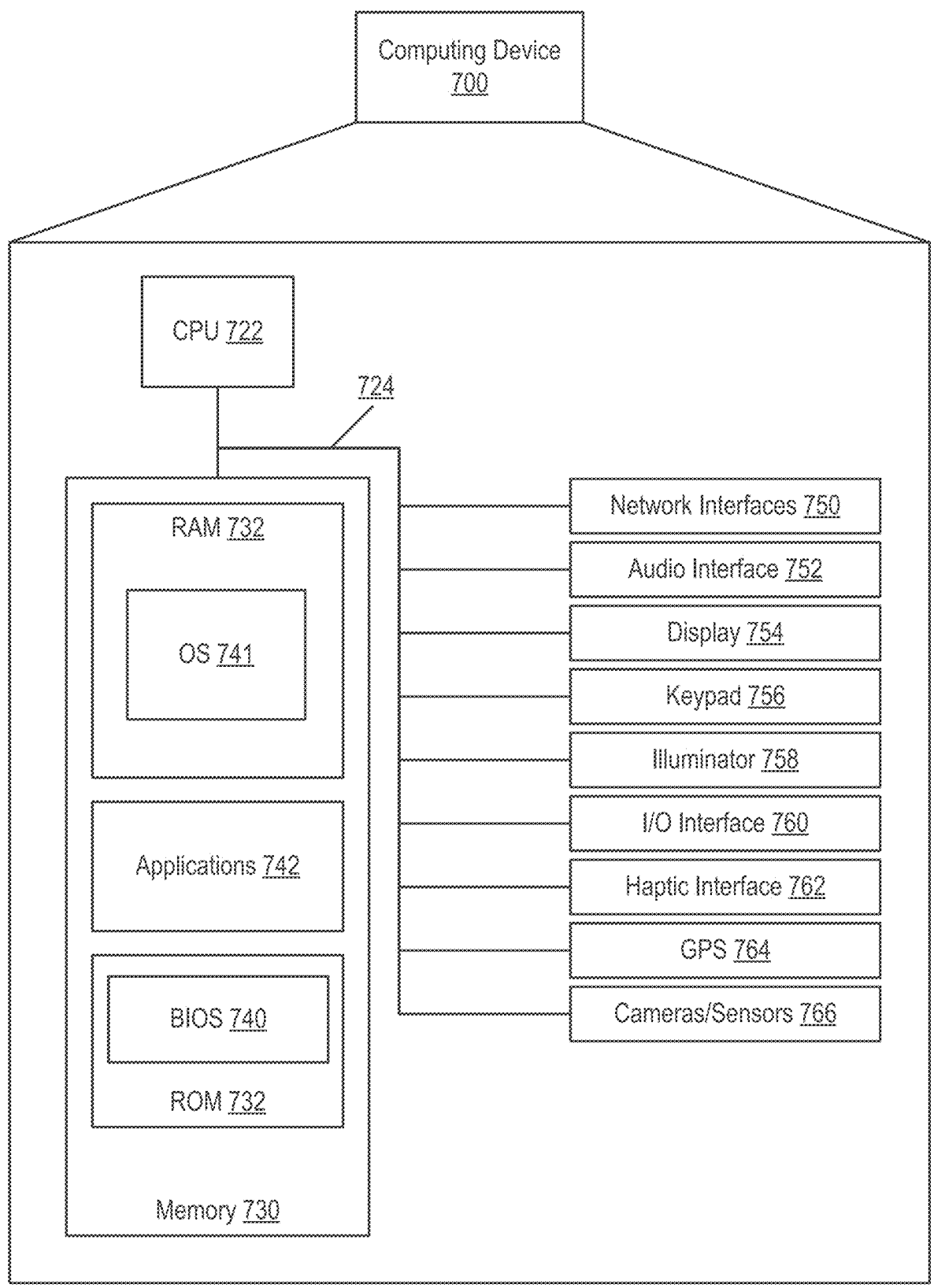
FIG. 7 is a block diagram illustrating a computing device showing an example of a client or server device used in various embodiments of the present disclosure.

FIG. 7 is a block diagram illustrating a computing device 700 (e.g., UE 700, as discussed above) showing an example of a client device or server device used in the various embodiments of the disclosure.

The computing device 700 may include more or fewer components than those shown in FIG. 7, depending on the deployment or usage of the device 700. For example, a server computing device, such as a rack-mounted server, may not include audio interfaces 752, displays 754, keypads 756, illuminators 758, haptic interfaces 762, GPS receivers 764, or cameras/sensors 766. Some devices may include additional components not shown, such as graphics processing unit (GPU) devices, cryptographic co-processors, artificial intelligence (AI) accelerators, or other peripheral devices.

As shown in FIG. 7, the device 700 includes a central processing unit (CPU) 722 in communication with a mass memory 730 via a bus 724. The computing device 700 also includes one or more network interfaces 750, an audio interface 752, a display 754, a keypad 756, an illuminator 758, an input/output interface 760, a haptic interface 762, an optional GPS receiver 764 (and/or an interchangeable or additional GNSS receiver) and a camera(s) or other optical, thermal, or electromagnetic sensors 766. Device 700 can include one camera/sensor 766 or a plurality of cameras/sensors 766. The positioning of the camera(s)/sensor(s) 766 on the device 700 can change per device 700 model, per device 700 capabilities, and the like, or some combination thereof.

In some embodiments, the CPU 722 may comprise a general-purpose CPU. The CPU 722 may comprise a single-core or multiple-core CPU. The CPU 722 may comprise a system-on-a-chip (SoC) or a similar embedded system. In some embodiments, a GPU may be used in place of, or in combination with, a CPU 722. Mass memory 730 may comprise a dynamic random-access memory (DRAM) device, a static random-access memory device (SRAM), or a Flash (e.g., NAND Flash) memory device. In some embodiments, mass memory 730 may comprise a combination of such memory types. In one embodiment, the bus 724 may comprise a Peripheral Component Interconnect Express (PCIe) bus. In some embodiments, the bus 724 may comprise multiple busses instead of a single bus.

Mass memory 730 illustrates another example of computer storage media for the storage of information such as computer-readable instructions, data structures, program modules, or other data. Mass memory 730 stores a basic input/output system ("BIOS") 740 for controlling the low-level operation of the computing device 700. The mass memory also stores an operating system 741 for controlling the operation of the computing device 700.

Applications 742 may include computer-executable instructions which, when executed by the computing device 700, perform any of the methods (or portions of the methods) described previously in the description of the preceding Figures. In some embodiments, the software or programs implementing the method embodiments can be read from a hard disk drive (not illustrated) and temporarily stored in RAM 732 by CPU 722. CPU 722 may then read the software or data from RAM 732, process them, and store them to RAM 732 again.

The computing device 700 may optionally communicate with a base station (not shown) or directly with another computing device. Network interface 750 is sometimes known as a transceiver, transceiving device, or network interface card (NIC).

The audio interface 752 produces and receives audio signals such as the sound of a human voice. For example, the audio interface 752 may be coupled to a speaker and microphone (not shown) to enable telecommunication with others or generate an audio acknowledgment for some action. Display 754 may be a liquid crystal display (LCD), gas plasma, light-emitting diode (LED), or any other type of display used with a computing device. Display 754 may also include a touch-sensitive screen arranged to receive input from an object such as a stylus or a digit from a human hand.

Keypad 756 may comprise any input device arranged to receive input from a user. Illuminator 758 may provide a status indication or provide light.

The computing device 700 also comprises an input/output interface 760 for communicating with external devices, using communication technologies, such as USB, infrared, Bluetooth™, or the like. The haptic interface 762 provides tactile feedback to a user of the client device.

The optional GPS transceiver 764 can determine the physical coordinates of the computing device 700 on the surface of the Earth, which typically outputs a location as latitude and longitude values. GPS transceiver 764 can also employ other geo-positioning mechanisms, including, but not limited to, triangulation, assisted GPS (AGPS), E-OTD, CI, SAI, ETA, BSS, or the like, to further determine the physical location of the computing device 700 on the surface of the Earth. In one embodiment, however, the computing device 700 may communicate through other components, provide other information that may be employed to determine a physical location of the device, including, for example, a MAC address, IP address, or the like.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
receiving, by a device, a query, the query comprising a request for information stored in a database, the received query initially configured to read base tables of the database;
identifying, by the device, based at least on the request, a set of coverage filters that each corresponds to at least one column field of the database;
accessing, by the device, a plurality of materialized views based on the identified set of coverage filters, each of the plurality of materialized views being previously generated in response to a past query performed in relation to the database, each materialized view having an associated coverage filter;
determining, by the device, a set of materialized views from the plurality of materialized views based on the coverage filters of each materialized view and the request;
aggregating, by the device, via execution of a view matching and view combination algorithm, the determined set of materialized views;
modifying, by the device, the received query, the modification causing the query to function to read the determined set of materialized views instead of the initially configured base tables;
executing, by the device, the modified query against the database based on the aggregated set of materialized views; and
providing, by the device, a result based on execution of the query.

2. The method of claim 1, wherein the query further comprises a transaction validity qualifier, the transaction validity qualifier comprising information related to attributes of a materialized view.

3. The method of claim 2, further comprising:
identifying, by the device, based at least on the transaction validity qualifier, a set of coverage filters that each correspond to at least one column field of the database;
accessing, by the device, a second plurality of materialized views, each of the second plurality of materialized views being previously generated in response to a past query performed in relation to the database, each second materialized view having an associated transaction validity qualifier;
determining, by the device, a validity filter predicate based on the transaction validity qualifier of the query and the transaction validity qualifier of each materialized view of the second plurality of materialized views;
determining, by the device, a second set of materialized views from the second plurality of materialized views based on the validity filter predicate; and
executing, by the device, the query against the database based on the determined second set of materialized views.

4. The method of claim 1, further comprising:
identifying, by the device, a third set of materialized views that corresponds to a set of queries;
analyzing, by the device, each materialized view in the third set of materialized views; and
determining a change between each materialized view in the third set of materialized views.

5. The method of claim 4, further comprising:
generating, by the device, a set of change summaries based on the determined changes, each change summary comprising information indicating differences of attributes between the materialized views of the third set of materialized views;

determining, by the device, a watermark in relation to a validity of the change summary; and determining, by the device, a filter predicate for each materialized view in the third set of materialized view, the filter predicate enabling a filter functionality that identifies and avoids usage of stale data within a materialized view.

6. The method of claim 5, further comprising:

determining, by the device, a fourth set of materialized views from the plurality of materialized views based on the coverage filters of each materialized view, the request and the filter predicate; and executing, by the device, the query against the database based on the determined fourth set of materialized views.

7. The method of claim 5, further comprising:

identifying, by the device, a sixth set of materialized views based on the set of change summaries and the request;

identifying, by the device, a validity filter for identifying invalid data;

analyzing, by the device, the sixth set of materialized views based on the validity filter; and determining, by the device, accessible data within the database responsive to the query.

8. The method of claim 7, further comprising:

identifying, by the device, a seventh set of materialized views, each materialized view corresponding to accessible data; and executing, by the device, the query in relation to the seventh set of materialized views.

9. The method of claim 1, further comprising:

identifying that a portion of the set of materialized views have overlapping data; and automatically filtering the portion to reduce redundancy in the set of materialized views.

10. A non-transitory computer-readable storage medium tangibly encoded with computer-executable instructions, that when executed by a device, perform a method comprising:

receiving, by the device, a query, the query comprising a request for information stored in a database, the received query initially configured to read base tables of the database;

identifying, by the device, based at least on the request, a set of coverage filters that each corresponds to at least one column field of the database;

accessing, by the device, a plurality of materialized views based on the identified set of coverage filters, each of the plurality of materialized views being previously generated in response to a past query performed in relation to the database, each materialized view having an associated coverage filter;

determining, by the device, a set of materialized views from the plurality of materialized views based on the coverage filters of each materialized view and the request;

aggregating, by the device, via execution of a view matching and view combination algorithm, the determined set of materialized views;

modifying, by the device, the received query, the modification causing the query to function to read the determined set of materialized views instead of the initially configured base tables;

executing, by the device, the modified query against the database based on the aggregated set of materialized views; and providing, by the device, a result based on execution of the query.

11. The non-transitory computer-readable storage medium of claim 10, further comprising:

identifying, by the device, based at least on a transaction validity qualifier comprised within the query, a set of coverage filters that each correspond to at least one column field of the database, wherein the transaction validity qualifier comprising information related to attributes of a materialized view;

accessing, by the device, a second plurality of materialized views, each of the second plurality of materialized views being previously generated in response to a past query performed in relation to the database, each second materialized view having an associated transaction validity qualifier;

determining, by the device, a validity filter predicate based on the transaction validity qualifier of the query and the transaction validity qualifier of each materialized view of the second plurality of materialized views;

determining, by the device, a second set of materialized views from the second plurality of materialized views based on the validity filter predicate; and executing, by the device, the query against the database based on the determined second set of materialized views.

12. The non-transitory computer-readable storage medium of claim 10, further comprising:

identifying, by the device, a third set of materialized views that corresponds to a set of queries;

analyzing, by the device, each materialized view in the third set of materialized views;

determining a change between each materialized view in the third set of materialized views;

generating, by the device, a set of change summaries based on the determined changes, each change summary comprising information indicating differences of attributes between the materialized views of the third set of materialized views;

determining, by the device, a watermark in relation to a validity of the change summary; and determining, by the device, a filter predicate for each materialized view in the third set of materialized view, the filter predicate enabling a filter functionality that identifies and avoids usage of stale data within a materialized view.

13. The non-transitory computer-readable storage medium of claim 12, further comprising:

determining, by the device, a fourth set of materialized views from the plurality of materialized views based on the coverage filters of each materialized view, the request and the filter predicate; and executing, by the device, the query against the database based on the determined fourth set of materialized views.

14. The non-transitory computer-readable storage medium of claim 12, further comprising:

identifying, by the device, a sixth set of materialized views based on the set of change summaries and the request;

identifying, by the device, a validity filter for identifying invalid data;

analyzing, by the device, the sixth set of materialized views based on the validity filter;

determining, by the device, accessible data within the database responsive to the query;

identifying, by the device, a seventh set of materialized views, each materialized view corresponding to accessible data; and executing, by the device, the query in relation to the seventh set of materialized views.

15. A device comprising:

a processor configured to:

receive a query, the query comprising a request for information stored in a database, the received query initially configured to read base tables of the database;

identify, based at least on the request, a set of coverage filters that each corresponds to at least one column field of the database;

access a plurality of materialized views based on the identified set of coverage filters, each of the plurality of materialized views being previously generated in response to a past query performed in relation to the database, each materialized view having an associated coverage filter;

determine a set of materialized views from the plurality of materialized views based on the coverage filters of each materialized view and the request;

aggregate, via execution of a view matching and view combination algorithm, the determined set of materialized views;

modify the received query, the modification causing the query to function to read the determined set of materialized views instead of the initially configured base tables;

execute the modified query against the database based on the aggregated set of materialized views; and provide a result based on execution of the query.

16. The device of claim 15, wherein the processor is further configured to:

receive the query, the query further comprising a transaction validity qualifier, the transaction validity qualifier comprising information related to attributes of a materialized view;

identify, based at least on the transaction validity qualifier, a set of coverage filters that each correspond to at least one column field of the database;

access a second plurality of materialized views, each of the second plurality of materialized views being previously generated in response to a past query performed in relation to the database, each second materialized view having an associated transaction validity qualifier;

determine a validity filter predicate based on the transaction validity qualifier of the query and the transaction validity qualifier of each materialized view of the second plurality of materialized views;

determine a second set of materialized views from the second plurality of materialized views based on the validity filter predicate; and execute the query against the database based on the determined second set of materialized views.

17. The device of claim 15, further comprising:

identify a third set of materialized views that corresponds to a set of queries;

analyze each materialized view in the third set of materialized views;

determine a change between each materialized view in the third set of materialized views;

generate a set of change summaries based on the determined changes, each change summary comprising information indicating differences of attributes between the materialized views of the third set of materialized views;

determine a watermark in relation to a validity of the change summary;

determine a filter predicate for each materialized view in the third set of materialized view, the filter predicate enabling a filter functionality that identifies and avoids usage of stale data within a materialized view;

determine a fourth set of materialized views from the plurality of materialized views based on the coverage filters of each materialized view, the request and the filter predicate; and executing, by the device, the query against the database based on the determined fourth set of materialized views.

* * * * *